United States Patent [19]

Buss et al.

[11] 3,963,623

[45] June 15, 1976

[54] ROTARY VACUUM DRUM FILTER

[76] Inventors: Stephen Alan Buss; Benjamin Alvin Buss, both of 1315 - 23rd Ave. Court, East Moline, Ill. 61244

[22] Filed: Jan. 6, 1975

[21] Appl. No.: 538,605

[52] U.S. Cl. ............................... 210/401; 210/406
[51] Int. Cl.² ........................................ B01D 33/14
[58] Field of Search ............ 162/348, 369; 210/386, 210/387, 391, 400, 401, 404, 406, 416

[56] References Cited
UNITED STATES PATENTS

| | | | |
|---|---|---|---|
| 82,735 | 10/1968 | Merrill | 210/401 |
| 1,201,021 | 10/1916 | Callow | 210/391 |
| 2,823,806 | 2/1958 | Harlan | 210/387 |
| 3,254,768 | 6/1966 | Shimizu | 210/386 X |
| 3,330,416 | 7/1967 | Hornbostel | 210/387 |
| 3,565,757 | 2/1971 | Jordansson | 162/348 |
| 3,704,788 | 12/1972 | Goodman et al. | 210/401 |
| 3,800,952 | 4/1974 | Bastgen | 210/400 |
| R24,430 | 2/1958 | Hornbostel | 210/387 |

*Primary Examiner*—Theodore A. Granger
*Attorney, Agent, or Firm*—R. L. Hollister

[57] ABSTRACT

A rotary drum filter arrangement in which an endless flexible filter belt is trained around at least 270° of the vacuum drum and leaves the vacuum drum for application of a slurry and formation of a cake remote from the drum. In one form of the invention the slurry is applied to a substantially horizontal portion of the belt prior to entry onto the vacuum drum so gravity aids in initial dewatering. In another form of the invention the cake is formed by an auxiliary vacuum drum prior to entry onto the main vacuum drum. By utilizing at least 270° of the vacuum drum after formation of the cake, the invention provides a drier cake, easier adaptation of auxiliary washing and drying equipment and/or permits the use of a smaller vacuum drum.

13 Claims, 6 Drawing Figures

ROTARY VACUUM DRUM FILTER

BACKGROUND OF THE INVENTION

The present invention relates generally to the art of filtration, and more particularly relates to rotary vacuum drum filters of the type employing endless flexible filter belts and used in both commercial processes and municipal sewage water reclamation systems for the separation of large amounts of solids from suspension in a liquid slurry.

While rotary vacuum drum filters of the type employing an endless flexible filter belt have an established place in filtration installations, they have until the present invention had their shortcomings or disadvantages. In the typical rotary vacuum drum filter arrangement much of the drum periphery is needed for the formation of a cake, leaving only about 120° of the drum periphery for dewatering and drying. This small amount of drying area severely limited the dryness which could be obtained and made the adaptation of (1) additional operations such as cake washing and (2) external drying aids such as forced air or radiant heat extremely difficult.

Also, in the typical rotary vacuum drum filter arrangement, the drum is suspended in a slurry tank so that the cake is formed on the lower part of the drum. Such an arrangement has the disadvantage of requiring greater vacuum values since the cake must be formed against the force of gravity. Furthermore, heavier particles will not attach themselves to the cake, but will settle to the bottom of the slurry tank in spite of any turbulance in the slurry. Settling particles will eventually require cleaning of the slurry tank which means an interruption in the so-called continuous process.

The present invention is directed to a solution of the abovementioned shortcomings with conventional rotary vacuum drum filter arrangements.

SUMMARY OF THE INVENTION

A primary object of the present invention is to provide a rotary vacuum drum filter arrangement employing an endless flexible filter belt wherein the cake dewatering and drying area on the drum is greater than that available on a comparably sized drum in a conventional system.

Another primary object of the present invention is to provide a rotary vacuum drum filter arrangement employing an endless flexible filter belt wherein increased dewatering and drying area on the vacuum drum is obtained without increasing the size of the drum and without sacrifice of any of the advantages obtained with conventional rotary vacuum drum filters.

A further object of the present invention is to provide a rotary vacuum drum filter arrangement wherein up to 270° or more of the periphery of the vacuum drum is used for dewatering and drying.

Still another object of the present invention is to provide a rotary vacuum drum filter arrangement employing an endless flexible filter belt wherein a slurry is applied to and a cake formed on the filter belt in an area removed from the vacuum drum.

The above and additional objects and advantages of the present invention will become apparent to those skilled in the art from a reading of the following detailed description when taken in conjunction with the accompanying drawings.

DESCRIPTION OF THE PREFERRED EMBODIMENTS

Figure 2:
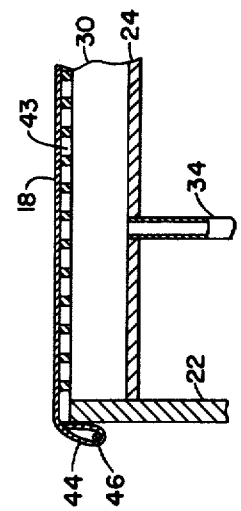
FIG. 2 is a sectional view taken along the lines 2—2 of FIG. 1.
Figure 1:
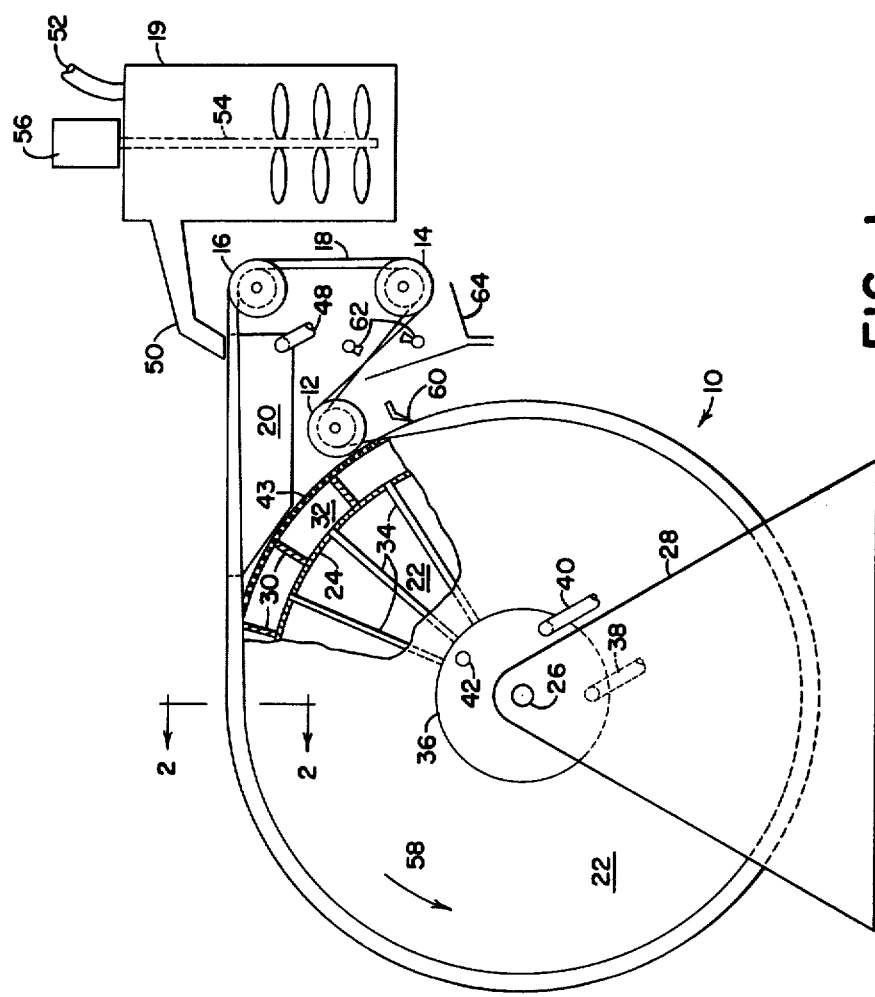
FIG. 1 is an elevational, somewhat schematic view of a rotary vacuum drum filter arrangement according to the present invention.

A first embodiment of the invention, as illustrated in FIGS. 1 and 2, includes a rotary vacuum drum indicated generally at 10, guide rollers 12, 14 and 16, an endless flexible filter belt 18, a slurry container 19, and a vacuum tray 20.

The rotary vacuum drum 10 can be of any known conventional structure, and is shown as including a pair of imperforate end disks 22 joined together by an imperforate shell or tubular member 24. The end disks are mounted on a shaft 26 which in turn is journaled on a drum support 28. The shaft 26 is adapted to be driven through any suitable drive means which is not illustrated since the particular type of drive means does not form a part of the present invention. The disks 22 extend radially beyond the tubular member 24 and circumferentially spaced parallel ribs 30 extend between the disks to form a plurality of shallow chambers 32 about the periphery of the drum. A plurality of exhaust lines 34 extend from the chambers 32 to a suitable rotary valve 36 which is connected to a vacuum or subatmospheric source (not shown) by one of the lines 38 and 40. The valve 36 also vents a portion of the drum to the atmosphere through opening 42. A grid 43 extends around the periphery of the drum 10 to provide a support for the belt 18.

The guide rollers are mounted for rotation in any suitable manner with their axis of rotation parallel to the shaft 26. The guide roller 16 is preferably mounted with the uppermost portion of its periphery in the same horizontal plane as the uppermost portion of the periphery of the drum 10. The guide roller 12 is mounted closely adjacent to the drum 10 and as high as possible without interfering with the vacuum tray 20. The guide roller 14 is mounted in any suitable position in which it will serve to transfer the endless flexible filter belt 18 from the guide roller 12 to the guide roller 16.

The endless flexible filter belt 18 is trained about the drum and rollers so that it extends from the uppermost portion of the periphery of the roller 16 to the uppermost portion of the periphery of the drum 10, around the drum 10, between the drum 10 and roller 12, over the roller 12, under the roller 14, and back to the roller 16. The belt 18 is slightly wider than the drum 10 and its outer edges extend over the sides of the drum where they are overlapped to form a tubular seam 44. A suitable tensioning member 46 extends through the seam 44 to maintain the filter belt reasonably taut on the rollers and drum. In ths regard, the rollers preferably have a greater length than the drum and are provided with grooves adjacent to their outer ends to receive the tensioning member and maintain the belt in proper alignment.

The vacuum tray 20 is mounted directly beneath and in sliding engagement with the portion of the filter belt extending between the uppermost portions of the peripheries of the roller 16 and drum 10. In this embodiment of the invention the vacuum tray 20 is rigidly mounted in a stationary position in any suitable manner and its upper surface is provided with an antifriction synthetic material which will prevent undue wear on the filter belt. The vacuum tray is a simple container which is connected to a vacuum source through a line 48 and which has a grilled or similar perforate top surface.

The slurry container or tank 19 is mounted in any suitable position to deposit a slurry on the belt 18 over the vacuum tray 20. As illustrated, the tank 19 is located alongside the rollers 14 and 16 and has a deposit spout 50 which extends over the belt 18 and tray 20. The tank is fed through a slurry feed line 52, and a mixer 54 driven by suitable drive means 56 maintains sufficient turbulance in the container to prevent solid particles from settling out of the slurry.

In operation the drum 10 is driven in a counter-clockwise direction as indicated by the arrow 58 in FIG. 1. As slurry is deposited on the belt 18 over the tray 20, initial dewatering and cake formation take place prior to the drum 10 and, since the slurry is deposited on the upper portion of the belt 18, the initial dewatering is aided by gravity so the vacuum required for initial dewatering is relatively low. Also, since the cake enters onto the drum 10 at the upper portion thereof, the vacuum required to hold the cake on the belt 18 during the time when the cake is still relatively wet is quite low.

The cake is removed from the drum by a stripper 60 which is located as close as possible to the point where the belt 18 leaves the drum 10, and as the belt travels between the rollers 12 and 14 it is washed by water nozzles 62. A suitable drain pan 64 is positioned beneath the nozzles to collect the wash water. If desired, one of the lines 38 and 40 can be used to provide a slight blow-off pressure which lightly holds the belt 18 against the stripper 60.

It should be noted that since the slurry is applied to the belt and the cake formed on the belt prior to entry onto the drum 10, a larger portion of the periphery of the drum is available for drying of the cake. Also, the greater distance of travel on the periphery of the drum 10 makes it easier to adopt additional functions such as cake washing. As can be seen from the drawing, 270 degrees or more of the drum periphery is available for drying of the cake.

Figure 3:
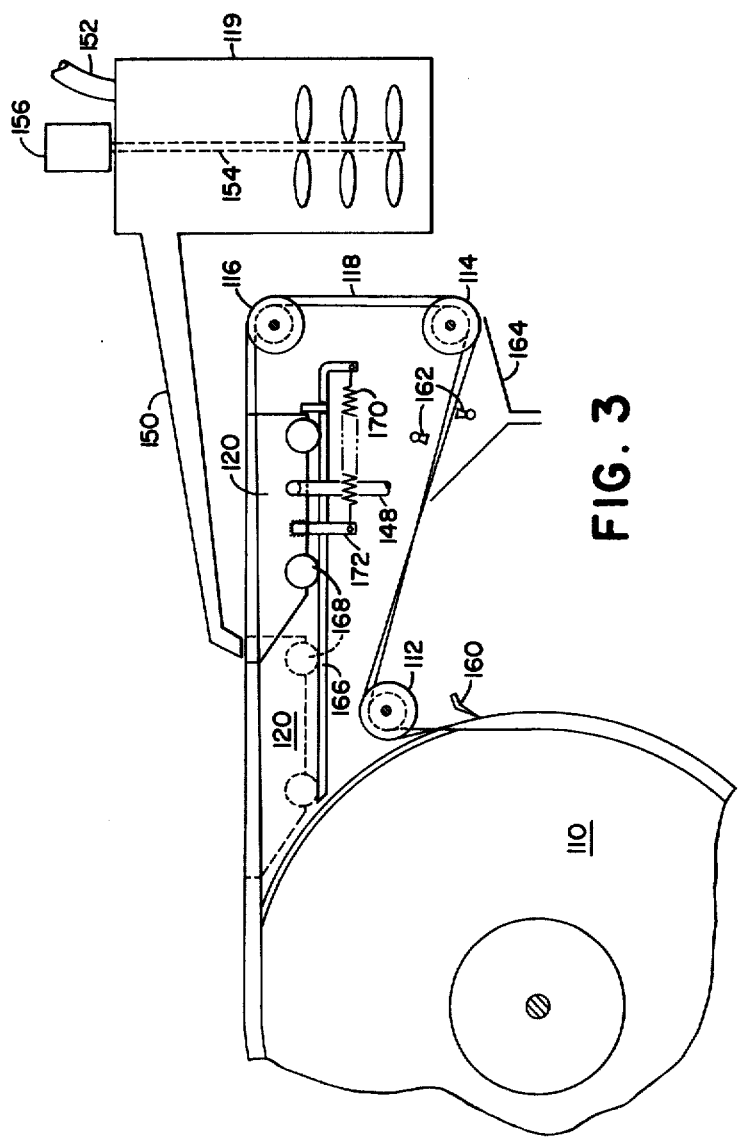
FIG. 3 is a view similar to FIG. 1 illustrating a first modification of the invention.

A second embodiment of the invention is illustrated in FIG. 3 and differs from the first embodiment by employing a traveling vacuum tray. The FIG. 3 embodiment of the invention includes a rotary vacuum drum 110, guide rollers 112, 114 and 116, an endless flexible filter belt 118, a slurry container 119, and a vacuum tray 120. The drum 110 is identical to the drum 10, the guide rollers 112, 114 and 116 are similar in construction to the guide rollers 12, 14 and 16, respectively, but the rollers 114 and 116 are positioned further from drum 110 to accommodate movement of the vacuum tray 120, the belt 118 is similar in construction to the belt 18, but is slightly longer to accomodate the different spacing of the rollers, and the slurry tank can be similar in construction to the tank 19 except that the deposit spout 150 is slightly longer.

The vacuum tray 120 is mounted on suitable tracks 166 through wheels 168 for movement between the solid and broken line positions illustrated in FIG. 3. A spring 170 is tensioned between the tracks 166 and a bracket 172 on the vacuum tray to resiliently bias the vacuum tray to the right, solid line position. The vacuum line 148 for the tray 120 is connected to a source of vacuum through a suitable valve which intermittently disrupts the vacuum in timed relation to the speed of the belt so that each time the vacuum tray 120 reaches the left broken line position the vacuum is disrupted.

The second embodiment of the invention also includes a scraper 160, washing nozzles 162 and a drain pan 164, all of which can be identical to the corresponding parts in the first embodiment. As in the first embodiment, the slurry tank 119 also includes a mixer 154 driven by suitable drive means 156, interupted, During operation of the second embodiment of the invention, vacuum applied to the tray 120 pulls the filter belt 118 against the top of the tray with sufficient force that the friction between the tray and belt causes the tray to move with the belt to the left. When the tray reaches the broken line position and the vacuum is interrupted, the friction between the belt and tray is reduced and the spring 170 returns the tray to the right. With this construction and operation, the only relative movement between the belt and tray occurs when the friction between the two is at a minimum so wear of the belt is kept at a minimum. In addition to providing reduced belt wear, the second embodiment of the invention has all the advantages set forth for the first embodiment.

Figure 4:
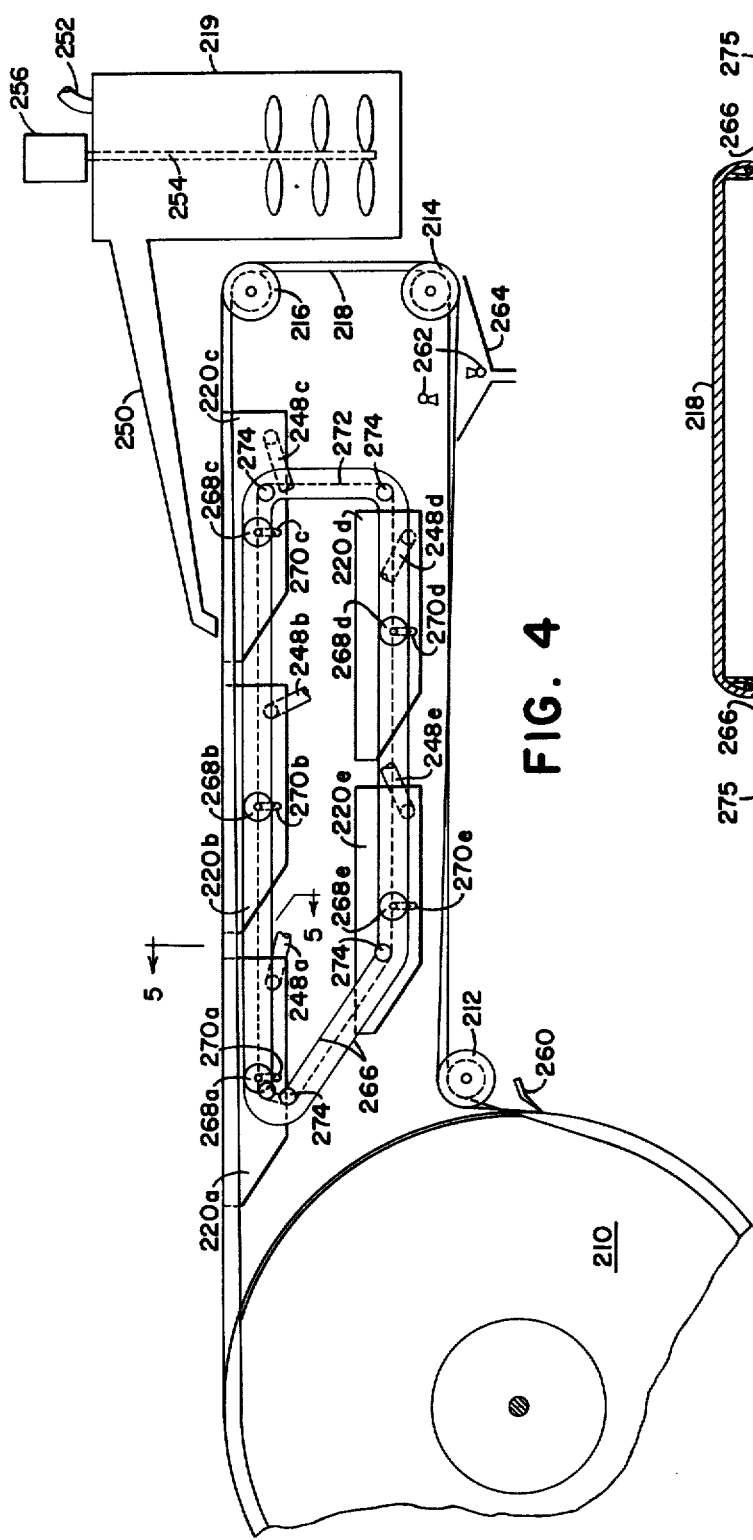
FIG. 4 is a view similar to FIG. 1 illustrating a second modification of the invention.
Figure 5:
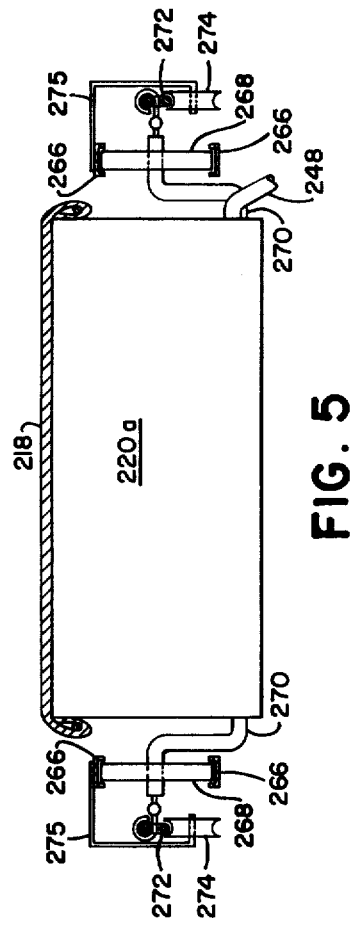
FIG. 5 is a sectional view taken along the lines 5—5 of FIG. 4.

A third embodiment of the invention is illustrated in FIGS. 4 and 5 and is similar to the first and second embodiments, but differs therefrom by having a plurality of movable vacuum trays. The third embodiment includes a drum 210, guide rollers 212, 214 and 216, an endless flexible filter belt 218, a slurry container 219, and a plurality of vacuum trays 220a – 220e. The drum 210 is identical to the drums in the first two embodiments, the guide rollers 212, 214 and 216 are similar in construction to the guide rollers in the first two embodiments, but are positioned further from the drum to accomodate the plurality of vacuum trays, the belt 218 is similar in construction to the filter belt in the first two embodiments, but is slightly longer to accomodate the greater spacing between the drum and rollers, and the slurry container is similar in construction to the slurry container in the first two embodiments.

The vacuum trays are carried on endless track means 266 having upper and lower runs through rollers 268 mounted on the trays by cranks 270. The trays are interconnected for equal and simultaneous movement by a chain represented by the broken line 272 in FIG. 4. The chain 272 extends around rollers 274 which are supported from the track means by brackets 275. If desired, any one or more of the rollers 274 may be driven in any suitable manner in timed relation with the filter belt so that it is not necessary to rely completely upon friction between the filter belt and trays to drive the trays. The vacuum lines 248a – 248e are connected to the trays through suitable rotary couplings and are connected to a vacuum source through a suitable rotary valve which disrupts communication between the trays and vacuum source at all times that the trays are not on the upper run of the endless track means.

The third embodiment of the invention also includes a scraper 260, washing nozzles 262, and a drain pan 264, all of which are identical to the corresponding parts in the first two embodiments. As in the first two embodiments of the invention, the slurry tank 219 includes a deposit spout 250 and a mixer 254 driven by any suitable means 256.

During operation of the third embodiment of the invention the trays 220 are driven, either through friction, by one of the rollers 274, or by a combination of the two, at a speed equal to the speed of the belt so that during the time the trays are on the upper run of the endless track there is no relative movement between them and the belt 218 and no wear occurs on the belt due to friction between the belt and trays. In addition to providing no wear on the belt 218 due to friction between the belt and trays, the third embodiment of the invention also includes all the advantages set forth for the first two embodiments.

Figure 6:
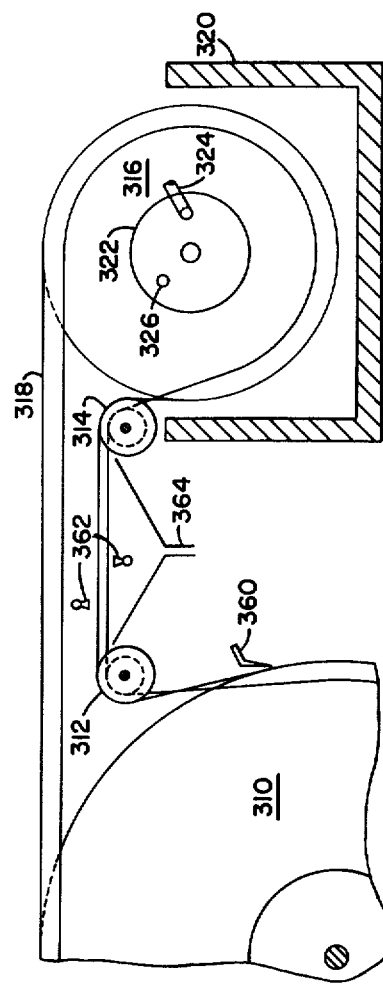
FIG. 6 is a view similar to FIG. 1 illustrating a third modification of the invention.

A fourth embodiment of the invention is illustrated in FIG. 6 and is similar to the above-described embodiments in that the slurry is applied to and the cake formed on the filter belt remote from the drum, but differs from the above-described embodiments in the manner that the slurry is applied to and the cake formed on the filter belt.

The fourth embodiment of the invention includes a primary rotary vacuum drum 310, a pair of guide rollers 312 and 314, a secondary rotary vacuum drum 316, an endless flexible filter belt 318, and a slurry container or tank 320. The drum 310 is similar in construction to the vacuum drums in the first three embodiments, the rollers 312 and 314 are similar in construction to the rollers 12, 14, 112, 114, 212 and 214 in the first three embodiments, and the filter belt is similar in construction to the filter belts in the first three embodiments.

The vacuum drum 316 has the same general constructional details as the drum 310, but has a somewhat simplified rotary valve 322 which requires only a single exhaust line 324 which will be connected to a suitable source of vacuum so that approximately 270 degrees of the periphery of the drum 316 will be subjected to a vacuum. The valve 322 vents the remaining portion of the periphery of the drum 316 to atmosphere through vent hole 326.

The roller 314 is mounted adjacent to the drum 316 in a manner similar to the mounting of the roller 312 with respect to the drum 310. The belt 318 extends around the drum 310, between the drum 310 and roller 312, over the roller 312, over the roller 314, between the roller 314 and the drum 316, around the drum 316 and back to the drum 310. The drum 316 is positioned within the slurry container 320 so that, upon rotation of the drums 310 and 316, a cake is formed on the lower half of the drum 316, initial dewatering of the cake is performed on the upper portion of the periphery of the drum 316, and the cake is transferred to the drum 310 for drying. As the cake moves around the drum 310, the dried cake is removed from the belt 318 by a scraper 360. The lower reach of the belt is washed by nozzles 362 and the wash liquid is collected by the drain pan 364.

In the fourth embodiment of the invention the vacuum needed to form a cake is greater than in the first three embodiments since the fourth embodiment does not utilize gravity as an aid in forming the cake. However, the cake forming and initial dewatering take place remotely from the main drum 310 so that approximately 270° of the periphery of the drum 310 are available for drying and additional functions such as cake washing. The size of the drum 316 with respect to the drum 310 will depend primarily on the surface area desired for cake forming and initial dewatering, but may be smaller than the drum 310 for economy of material, may be of equal size for ease and economy of manufacture, or may be larger.

From the above detailed descriptions of four embodiments of the invention, it can be seen that the present invention provides a rotary vacuum drum filter arrangement employing an endless flexible filter belt which is of simple construction and which provides increased dewatering and drying area without sacrificing any of the advantages obtained with conventional rotary vacuum drum filters.

Having thus described several embodiments of the invention, various modifications within the spirit and scope of the invention will be apparent to those skilled in the art and such obvious modifications can be made without departing from the underlying principles of the invention. Therefore, the invention should not be limited by the specific illustrations and description, but only by the following claims.

We claim:
1. A rotary drum filter arrangement comprising:
   a. a vacuum drum mounted for rotation about a substantially horizontal axis;
   b. a rotatable member spaced from the vacuum drum and mounted for rotation about an axis parallel to the axis of the filter drum with the upper portion of its periphery in substantially horizontal alignment with the upper portion of the periphery of the vacuum drum;
   c. a roller mounted for movement about an axis parallel to the axis of the vacuum drum in a position generally between the vacuum drum and rotatable member, closely adjacent to the vacuum drum and above a horizontal plane passing through the axis of rotation of the vacuum drum;
   d. an endless flexible filter belt trained about the vacuum drum and rotatable member to form upper and lower reaches with the lower reach thereof passing between the vacuum drum and roller and over the roller whereby the filter belt is in engagement with at least 270 degrees of the periphery of the vacuum drum;
   e. means for rotating the vacuum drum in a direction to move the upper reach of the filter belt toward the vacuum drum;
   f. means for applying a slurry to the filter belt remote from the drum; and
   g. means including a vacuum means for forming a cake on the filter belt from the slurry applied thereto prior to the belt moving the slurry to the vacuum drum.

2. A rotary drum filter arrangement as set forth in claim 1, further including a second roller mounted for rotation about an axis generally parallel to the axis of rotation of the vacuum drum and positioned generally between the vacuum drum and rotatable member, closely adjacent to the rotatable member, and above a horizontal plane passing through the axis of rotation of the rotatable member, and wherein the lower reach of the filter belt passes over the second roller and between the rotatable member and second roller whereby the filter belt is in engagement with at least 270° of the periphery of the rotatable member.

3. A rotary drum filter arrangement as set forth in claim 2 wherein the means for applying a slurry to the filter belt includes a slurry tank, the rotatable member is positioned at least partially within the slurry tank, and the rotatable member is an auxiliary vacuum drum for forming a cake on the filter belt.

4. A rotary drum filter arrangement as set forth in claim 1 wherein the means for forming a cake on the filter belt forms the cake prior to the portion of the belt having the cake formed thereon leaving the rotatable member.

5. A rotary drum filter arrangement as set forth in claim 4 wherein the means for applying a slurry to the filter belt includes a slurry tank, and the rotatable member is positioned at least partially within the slurry tank.

6. A rotary drum filter arrangement as set forth in claim 1 wherein the means for applying a slurry to the filter belt applies the slurry to the upper surface of the upper reach thereof between the vacuum drum and rotatable member.

7. A rotary drum filter arrangement as set forth in claim 6 wherein the means for forming a cake on the filter belt includes at least one vacuum tray positioned between the upper and lower reaches of the filter belt with its upper surface in engagement with the upper reach of the belt, and means for establishing a vacuum in the tray whereby the vacuum in the tray draws filtrate from the slurry deposited on the filter belt to form a cake.

8. A rotary drum filter arrangement as set forth in claim 7 wherein the vacuum tray is mounted on track means for limited movement parallel to the movement of the upper reach of the filter belt, the means for establishing a vacuum in the vacuum tray includes means for intermittently disrupting the vacuum, and resilient means urge the vacuum tray in a direction opposite to the direction of movement of the upper reach of the filter belt whereby during periods of vacuum the friction between the filter belt and vacuum tray moves the vacuum tray with the filter belt and during periods of disruption of vacuum the resilient means moves the vacuum tray in the opposite direction.

9. A rotary drum filter arrangement as set forth in claim 6 wherein the means for forming a cake includes a plurality of vacuum trays between the vacuum drum and rotatable member mounted on endless track means having upper and lower runs with the upper run positioned to place the trays thereon in engagement with the lower surface of the upper reach of the filter belt, means interconnecting the trays for simultaneous and equal movement, and means for establishing a vacuum in each of the trays while it is carried on the upper run of the endless track means whereby the friction between the filter belt and trays caused by the vacuum moves the trays with the filter belt.

10. A rotary drum filter arrangement comprising:
 a. a vacuum drum rotatable about a substantially horizontal axis;
 b. a first roller member rotatable about an axis substantially parallel to the axis of the vacuum drum and positioned closely adjacent to the vacuum drum above a horizontal plane passing through the axis of the vacuum drum;
 c. a second roller member rotatable about an axis substantially parallel to the axis of the vacuum drum, spaced from the vacuum drum on the same side thereof as the first roller member and with the uppermost portion of its periphery at a higher elevation than the uppermost portion of the periphery of the first roller member;
 d. an endless flexible filter belt trained about the vacuum drum and second roller member to form upper and lower reaches with the lower reach passing between the vacuum drum and first roller member and over the first roller member;
 e. means for rotating the vacuum drum in a direction to move the upper reach of the filter belt toward the vacuum drum;
 f. means for depositing a slurry on the upper reach of the filter belt; and
 g. means including vacuum means associated with the upper reach of the filter belt for drawing filtrate from the slurry deposited thereon to form a cake.

11. A rotary drum filter arrangement as set forth in claim 10 wherein the means for forming a cake on the filter belt includes at least one vacuum tray positioned between the upper and lower reaches of the filter belt with its upper surface in engagement with the upper reach of the belt, and means for establishing a vacuum in the tray whereby the vacuum in the tray draws filtrate from the slurry deposited on the filter belt to form a cake.

12. A rotary drum filter arrangement as set forth in claim 11 wherein the vacuum tray is mounted on track means for limited movement parallel to the movement of the upper reach of the filter belt, the means for establishing a vacuum in the vacuum tray includes means for intermittently disrupting the vacuum, and resilient means urge the vacuum tray in a direction opposite to the direction of movement of the upper reach of the filter belt whereby during periods of vacuum the friction between the filter belt and vacuum tray moves the vacuum tray with the filter belt and during periods of disruption of vacuum the resilient means moves the vacuum tray in the opposite direction.

13. A rotary drum filter arrangement as set forth in claim 10 wherein the means for forming a cake includes a plurality of vacuum trays between the vacuum drum and second roller member mounted on endless track means having upper and lower runs with the upper run positioned to place the trays thereon in engagement with the lower surface of the upper reach of the filter belt, means interconnecting the trays for simultaneous and equal movement, and means for establishing a vacuum in each of the trays while it is carried on the upper run of the endless track means whereby the friction between the filter belt and trays caused by the vacuum moves the trays with the filter belt.

* * * * *